July 13, 1926.
F. GAHM
1,592,096
LUBRICATING MEANS FOR TRANSMISSION BANDS
Filed Sept. 26. 1923
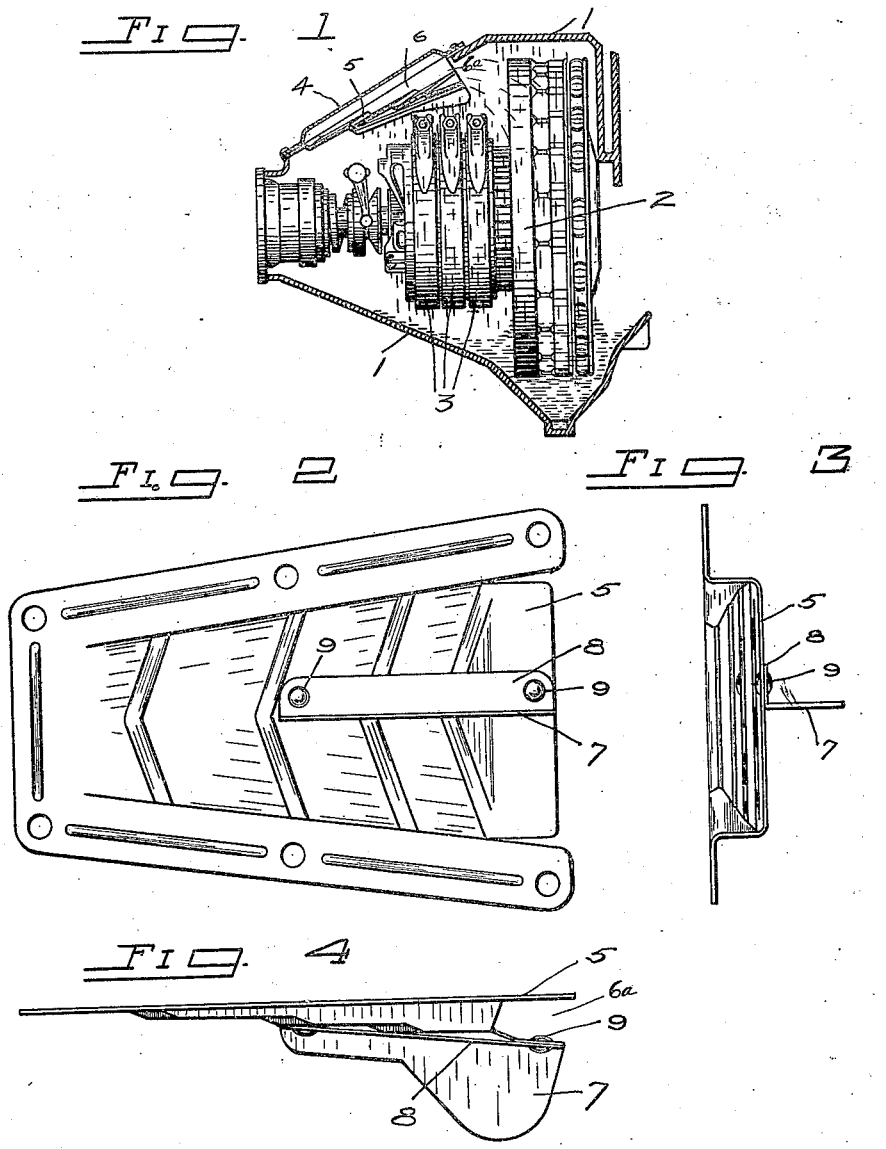
INVENTOR.
Frank Gahm,
BY
ATTORNEY Patented July 13, 1926.

1,592,096

UNITED STATES PATENT OFFICE.

FRANK GAHM, OF PASADENA, CALIFORNIA, ASSIGNOR TO W. O. THOMPSON, OF PASADENA, CALIFORNIA.

LUBRICATING MEANS FOR TRANSMISSION BANDS.

Application filed September 26, 1923. Serial No. 664,845.

My invention relates particularly to improved means for lubricating the transmission bands of an automobile of the Ford type and has as its principal object to provide a simple and efficient means and method of adequately lubricating these transmission bands without any considerable change of the mechanism used therein.

In an automobile of the type referred to, there is a fly wheel in the transmission case which dips into the lubricating oil in the lower part of said transmission case and throws said oil upwardly against the upper part of the transmission case, and particularly the cover to said case.

The object of my invention is to provide a baffle plate or fin-like member on the inner side of the top or cover of the transmission case, over the transmission bands and extending longitudinally of the axis of the case and of the fly wheel, whereby the oil thrown against the same by said fly wheel will drop directly down upon the transmission bands and thoroughly lubricate the same.

In order to explain my invention, I have illustrated one practical embodiment thereof in the accompanying sheet of drawings, which I will now describe.

Figure 1 is a partial view, in section, of the transmission case of an automobile, showing the fly wheel, the transmission bands, and my invention applied thereto; Figure 2 is a bottom plan view of a cover member with the invention thereon;

Figure 3 is an end view thereof; and

Figure 4 is a side view thereof.

In the drawings, 1, designates the transmission case, with the fly-wheel 2, and transmission bands, 3, 3, therein. In illustrating my invention, I have shown a double cover member for the transmission case, comprising the outer member, 4, and the inner member 5, providing a pocket or chamber, 6, therebetween, open at its end, as at 6ª, toward the fly-wheel, whereby lubricating oil is thrown by the fly-wheel and the forward movement of the car into said pocket, in a manner known and used in the art, for another purpose, as illustrated in the patent to Francisco, No. 1,208,126, issued Dec. 12, 1916.

In illustrating my invention, I have shown it in connection with such chambered cover for the transmisison, though it will be understood that it is not limited to use with such a cover, or with any cover member whatever.

As here embodied, the invention comprises a baffle plate, or fin-like member, 7, having a flange, 8, and secured to the cover member 5, by means of rivets, 8. Said baffle member, 7, extends longitudinally of said case and of the axis of the fly-wheel, and is positioned over the transmission bands, 3, 3, whereby the lubricating oil is thrown against the side of said baffle plate and drops down onto the transmission bands, thus thoroughly lubricating them, with a minimum of additional structure and at a minimum expense.

While I have shown but one embodiment of the invention, it is evident that it can be applied in many different ways within the spirit of the invention, and I do not limit the invention except as I may be limited by the hereto appended claim.

I claim:

In combination with a transmission case, fly-wheel and transmission bands, a cover for said transmission case, an oil catching pan suspended under the top of said transmission case to receive a reserve supply of lubricant, and a vertically positioned deflecting plate suspended under said pan and designed to have oil thrown against its vertical side above said bands, whereby to lubricate said bands.

Signed at Pasadena, Los Angeles County, California, this 20th day of September, 1923.

FRANK GAHM.